United States Patent [19]

Rokkaku et al.

[11] Patent Number: 4,664,572

[45] Date of Patent: May 12, 1987

[54] CHIP DISPOSER

[75] Inventors: Tadashi Rokkaku; Kazeushi Sugitani, both of Hiroshima, Japan

[73] Assignee: Mitsubishi Jukogyo Kabushiki Kaisha, Tokyo, Japan

[21] Appl. No.: 845,248

[22] Filed: Mar. 28, 1986

[30] Foreign Application Priority Data

| Apr. 3, 1985 [JP] | Japan | 60-70565 |
| Jul. 4, 1985 [JP] | Japan | 60-101202 |
| Jul. 4, 1985 [JP] | Japan | 60-101203 |
| Oct. 1, 1985 [JP] | Japan | 60-148943 |

[51] Int. Cl.$^4$ .................................. B23B 47/34
[52] U.S. Cl. .............. 409/137; 29/DIG. 95; 269/8; 335/288; 408/67; 408/76
[58] Field of Search ........... 409/137; 408/67, 76, 408/241 R; 269/8; 51/362; 279/1 M; 29/DIG. 94, DIG. 95; 335/285, 286, 287

[56] References Cited

U.S. PATENT DOCUMENTS

| 2,548,314 | 4/1951 | Kinney | 408/67 |
| 2,812,203 | 11/1957 | Scholten | 335/285 X |
| 2,893,551 | 7/1959 | Pirwitz | 269/8 |
| 4,419,644 | 12/1983 | Baermann | 335/288 |
| 4,427,960 | 1/1984 | Wuerfel | 335/285 |

Primary Examiner—Gil Weidenfeld
Assistant Examiner—Glenn L. Webb
Attorney, Agent, or Firm—Birch, Stewart, Kolasch & Birch

[57] ABSTRACT

An improved chip disposer which removes chips or iron chips produced from a machine tool by using magnetic force is disclosed. The chip disposer includes an extension shaft which is detachably mounted to a main shaft of the machine tool, an outer tube which is rotatably fitted to the extension shaft, a mechanism for preventing rotation of the outer tube in respect to a head of the main shaft when the extension shaft is mounted to the main shaft, a mechanism for positioning the extension shaft with regard to the outer shaft in a predetermined rotational angle, a plurality of permanent magnets disposed in a ring in an end of the outer tubes so that the same poles of the adjacent magnets are opposed to each other through attracting rods, respectively, and a plurality of permanent magnets disposed in a ring around the extension shaft so that the S- and N-poles thereof are alternately opposed to inner peripheries of the plurality of attracting rods, whereby a relative position of the permanent magnets in the end of the outer tube and the permanent magnets around the extension shaft is changed in response to normal rotation and reverse rotation of the main shaft to turn on and off attractive force.

9 Claims, 15 Drawing Figures

CHIP DISPOSER

BACKGROUND OF THE INVENTION

1. Field of the Invention

The present invention relates to an improved chip disposer using permanent magnets applied to dispose of chips or iron chips produced from a machine tool such as a machining centre.

2. Description of Background Art

In recent years, disposal of a large amount of chips or iron chips produced by cutting work in a machine tool became a severe problem with the progress of unattended operation in a machine factory. Particularly, chips deposited on a workpiece, jig, pallet, table and the like on an NC (Numerical Controlled) machine tool such as a machining centre could cause the following problems:

(1) The deposited chips disturb unattended exchange of a workpiece in an exchange station of the workpiece. The chips also reduce working efficiency remarkably even in exchange operation of the workpiece by an operator.

(2) The chips are scattered in a carrying path for the workpiece and the pallet and a pallet pool, and the working environment is deteriorated.

(3) The chips deposited on the workpiece can damage tools.

In order to solve the above problems, a method is now utilized in which the chips are flowered together with cutting oil, but this method is not sufficient.

Figure 10:
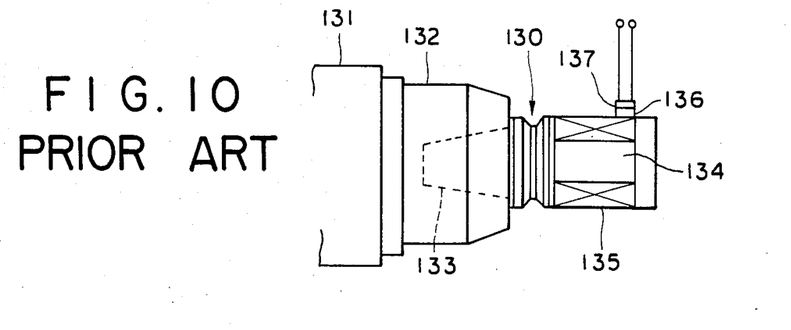
FIG. 10 is a side view of a prior art apparatus.

Further, an apparatus exists which utilizes magnetic force to attract the chips deposited on a workpiece, jig or table for removing the chips. FIG. 10 shows the apparatus. In FIG. 10, numeral 131 denotes a head stock and numeral 132 denotes a main shaft. A taper shank 133 of a chip removing apparatus 130 is detachably fitted in the main shaft 132. The apparatus 130 includes a magnetic core 134 and a coil 135 and forms an electromagnet when the coil 135 is excited by energizing devices 136 and 137. The electromagnet attracts chips deposited on a workpiece, jig or table and removes them from the machine tool.

Generally, a sufficiently large attractive force can not be obtained from the electromagnet when the number of turns of the coil 135 is not sufficiently large or when current flowing through the coil is not sufficiently large. However, when the number of turns of the coil 135 is increased, the apparatus can not be compact, while when large current flows through the coil, the energizing devices 136 and 137 are made larger and chips are attracted to the devices resulting in electric leakage.

SUMMARY OF THE INVENTION

The present invention has been made, to overcome the above problems in the prior art apparatus.

It is an object of the present invention to provide a chip disposer which is compact in structure and can provide an attractive force sufficient to dispose of chips.

It is another object of the present invention to provide a chip disposer having a structure in which there is no possibility of causing damage to a bearing supporting a main shaft or a positioning mechanism of an outer tube due to excessive torque upon rotation of the main shaft of a machine tool, particularly at a low speed rotational range.

It is still another object of the present invention to provide a further improved chip disposer.

In order to achieve the above object, the structure of the present invention is as follows:

According to a first aspect of the present invention, the chip disposer comprises an extension shaft which is detachably mounted to a main shaft of a machine tool, an outer tube formed of non-magnetic material and disposed on the extension shaft rotatably, a mechanism mounted on a head stock of a machine tool for preventing rotation of the outer tube, a mechanism for positioning the extension shaft in regard to the outer tube, a first permanent magnet group including a plurality of permanent magnets disposed in a ring in an end of the outer tube so that the same poles of the magnets are opposed to each other through attracting rods formed of magnetic material and a second permanent magnet group including a plurality of permanent magnets disposed in a ring around the extension shaft so that the S- and N-poles of the magnets are alternately opposed to inner peripheries of the plurality of attracting rods.

The apparatus can attract chips by means of magnetic force at its end and can change a relative position of the first permanent magnet group disposed on the outer tube and the second permanent magnet group disposed on the extension shaft in response to normal rotaion and reverse rotation of the main shaft to turn on and off the attractive force for chips.

According to a second aspect of the present invention, the chip disposer including an extension shaft which is detachably mounted to a main shaft of a machine tool, an outer tube which is formed of non-magnetic material and is rotatably fitted onto the extension shaft, a mechanism mounted on a head stock of a machine tool for preventing rotation of the outer tube, a mechanism for positioning the extension shaft in regard to the outer tube, a first permanent magnet group including a pluraity of permanent magnets disposed in a ring in an end of the outer tube so that the same poles of the magnets are opposed to each other through attracting rods formed of magnetic material and a second permanent magnet group including a plurality of permanent magnets disposed in a ring around the extension shaft so that the S- and N-poles of the magnets are alternately opposed to the inner peripheries of the plurality of attracting rods, thereby changing a relative position of the first permanent magnet group disposed in the outer tube and the second permanent magnet group disposed around the extension shaft in response to normal rotation and reverse rotation of main shaft to turn on and off an attractive force for chips, characterized in that the extension shaft is detachably and lockably supported to an end of a shank which is detachably mounted to the main shaft and a supporting portion of the extension shaft is rotatably supported, and a torque limiter is provided.

With such a structure, when torque of a predetermined value or more is applied to the shaft connection and support portion in the end of the shank, the connection and support portion in the end of the shank slips with regard to the shaft and damage by excessive torque is prevented.

According to a third aspect of the present invention, the chip disposer including an extension shaft which is detachably mounted to a main shaft of a machine tool, an outer tube which is formed of non-magnetic material and is rotatably fitted onto the extension shaft, a mechanism mounted to a head stock for preventing rotation of the outer tube, a mechanism for positioning the extension shaft in regard to the outer tube, a first permanent magnet group including a plurality of permanent magnets disposed in a ring in an end of the outer tube so that the same poles of the magnets are opposed to each other through attracting rods formed of magnetic material and a second permanent magnet group including a plurality of permanent magnets disposed in a ring around the extension shaft so that the S- and N-poles are alternately opposed to the inner peripheries of the plurality of attracting rods, thereby changing a relative position of the first permanent magnet group disposed in the outer tube and the second permanent magnet group disposed around the extension shaft in response to normal rotation and reverse rotation of the main shaft to turn on and off an attractive force for chips, characterized by the provision of a first outer shell of magnetic material disposed outside of the first permanent magnet group and a second outer shell of non-magnetic material disposed outside of the outer shell.

With the above structure, magnetic flux does not leak outside of the outer shell since the magnetic flux passes through the magnetic outer shell, while the magnetic flux leaks a little in the conventional apparatus when the attractive force is off. Accordingly, chips can be removed perfectly.

According to a fourth aspect of the present invention, the chip disposer including an extension shaft which is detachably and lockably supported to an end of a shank mounted detachably to a main shaft of a machine tool, an outer tube which is formed of non-magnetic material and is rotatably fitted to the extension shaft, a mechanism mounted on a head stock of the machine tool for preventing rotation of the outer tube, a mechanism for positioning the extension shaft in regard to the outer tube and an attracting unit disposed at an end of the outer tube for turning on and off an attractive force of permanent magnets for chips in response to rotation of the main shaft, characterized in that the attracting unit comprises a third and a fourth permanent magnet groups which are formed of a plurality of permanent magnets and are successively disposed along the longitudinal direction of the extension shaft on the outer periphery of the extension shaft at an end of the outer tube, the permanent magnets forming the third permanent magnet group being disposed in a ring so that the same poles of the magnets are opposed to each other through attracting rods formed of magnetic material, the permanent magnets forming the fourth permanent magnet group being disposed so that the S- and N-poles thereof are alternately opposed to the N-and S-poles of the permanent magnets of the third permanent magnet group through retaining members, one of the third and fourth permanent magnet group being disposed at the side of the extension shaft with the other being disposed at an end of the outer tube concentrically to the extension shaft.

The attracting unit thus constructed comprises the third and fourth permanent magnet group including a plurality of permanent magnets and disposed successively along the longitudinal direction of the shaft around the shaft in the end of the outer tube. The permanent magnets forming the third permanent magnet group is disposed in a ring in the circumferential direction so that the poles of the magnets are the same as those of the adjacent magnets and the permanent magnets forming the fourth permanent magnet group are disposed so that the S- and N-poles are alternately opposed to the N-and S-poles of the magnets of the third permanent magnet group. One of the magnet groups is disposed at the side of the shaft and the other is disposed in the end of the outer tube concentrically to the shaft. Accordingly, the magnetic flux density in the end of the attracting unit is concentrated and increased and the capability of attracting chips in the chip disposer for a vertical machining center can be enhanced, when the attractive force in on.

With the above structure, the present invention possesses the following effects:

(I) According to the first aspect of the present invention, since chips can be removed by the magnetic attractive force produced by combination of the permanent magnets, sufficient attractive force can be obtained with compact structure. Further, since rotation of the main shaft of the machine tool is utilized to turn on and off the attractive force, the chip disposer can be inexpensive and compact in structure and the present invention can be widely applied to automatic disposal of chips.

(II) According to the second aspect of the present invention, since exccessive torque is not applied to the apparatus and accordingly elements and bearings of the main shaft for the chip disposer are not damaged even if normal rotation or reverse rotation of the main shaft is utilized to turn on or off the attractive force for chips, any actuator is not required and the apparatus is inexpensive and compact. Further, rotation of the main shaft can be utilized to turn on and off the attractive force for chips and the reliability of the chip disposer utilizing the permanent magnets is increased to spread the utilization range thereof.

(III) According to the third aspect of the present invention, chips deposited on a workpiece and a table of the machine tool are attracted or collected to be carried on a chip conveyer which is not shown and is installed in the machine tool and the chips are dropped down on the conveyer by turning off the attractive force whereby, the chips can be removed automatically. Further, since magnetic flux of the permanent magnets does not leak at all when the attractive force is turned off, parts of chips are never left attached on the apparatus. Portions of the machine tool which the apparatus approaches, for example such as a main shaft, table and the like can be prevented from being magnetized.

According to the fourth aspect of the present invention, since the chip disposer can increase the magnetic flux density at the end of the chip attracting unit located at the end of the outer tube, the capability of removing chips can be increased particularly when the present apparatus is applied to a vertical machining centre.

Further, since the stationary permanent magnets and the movable permanent magnets are juxtaposed to each other in the longitudinal direction of the shaft, effective spacing can be obtained in design and manufacturing as compared with the prior art and the outer diameter of the attracting unit can be reduced. Accordingly, chips deposited in a narrow groove or a small hole can be easily removed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 2(A) and (B) are sectional views taken along line II—II of FIG. 1, in which FIG. 2(A) illustrates an OFF state of attractive force and FIG. 2(B) illustrates an On state of attractive force;

FIGS. 5(A) and (B) are sectional views taken along line V—V of FIG. 4, in which FIG. 5(A) illustrates an OFF state of attractive force and FIG. 5(B) illustrates an ON state of attractive force;

DETAILED DESCRIPTION OF PREFERRED EMBODIMENTS

Description is now made to the first to fourth embodiments with reference to the attached drawings.

First Embodiment

Figure 1:
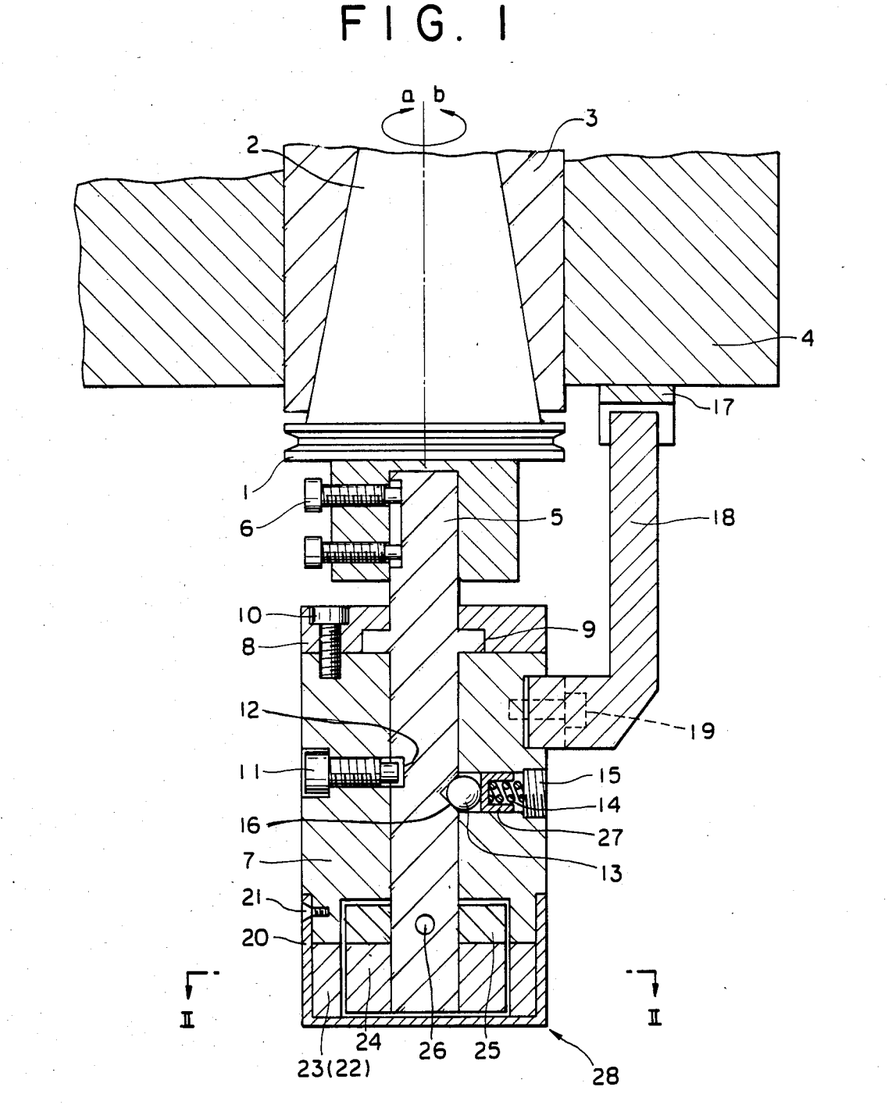
FIG. 1 is a longitudinal sectional view schematically illustrating a chip disposer according to a first embodiment of the present invention.

The first embodiment is now described on the basis of FIGS. 1 and 2. In FIG. 1, a taper shank 2 of a side lock holder 1 is detachably attached to a main shaft 3 of an NC type machine tool by means of an automatic tool exchanging device not shown. The main shaft 3 is rotatably supported by a head stock 4 through a bearing not shown and is adapted to be rotated by a motor, not shown, with the main shaft. An end of an extension shaft 5 (hereinafter referred to as a shaft) is fitted into a hole formed in the side lock holder 1 and is fixedly positioned thereto, by means of bolts 6, in the axial direction and in the rotational direction. An outer tube 7 includes an inner hole formed in the center thereof along the axis of the tube and the inner hole is fitted onto the shaft 5 so that the outer tube 7 is rotatably supported on the shaft 5. A flange 8 is fixedly mounted to the outer tube 7 by a plurality of bolts 10 so that a flange portion 9 of the shaft 5 is held in a predetermined gap formed between the flange 8 and the outer tube 7. A bolt 11 is screwed in the outer tube 7 and an end of bolt 11 is finished in a pin shape which is fitted into a groove 12 formed in the shaft 5 so that the shaft 5 can not angularly move 90° or more with regard to the outer tube 7. A piston 27 is fitted into a hole formed in the outer tube 7 in the radial direction of the tube 7 and is guided to be slidably moved in the radial direction. A steel ball 13 is pressed toward the center of the shaft 5 by means of the piston 27, a spring 14, and a screw 15 so that the ball 13 is fitted into one of two notches 16 which are formed in the shaft 5 in the rotational direction of the shaft 5 with a space of 90° between the two notches. The outer tube 7 is formed of non-magnetic material, for example such as aluminum or stainless steel and the shaft 5 is formed of magnetic material, for example steel, A whirl-stopped 17 is fixedly mounted on the head stock 4 and is formed with a groove into which an end of an arm 18 is fitted. The arm 18 is fixedly mounted to the outer tube 7 by a plurality of bolts 19. When the side lock holder 1 is attached to the main shaft 3 by an automatic tool exchanging unit not shown, the end of the arm 18 is fitted into the groove of the whirl-stopper 17 and the outer tube 7 is prevented from rotating with regard to the head stock 4.

A cap 20 formed of non-magnetic material such as stainless steel is fitted onto an end of the outer tube 7 and is fixed by a plurality of screws 21.

FIG. 2 shows a section taken along line II—II of FIG. 1. In FIG. 2, a plurality of arcuate stationary permanent magnets 22 are disposed in the circumferential direction so that the same poles thereof are opposed to each other through attracting rods 23 formed of magnetic material such as steel and the magnets 22 are disposed to form a ring together with the rods 23. The magnets 22 are fixedly mounted to the cap 20 by strong adhesives.

A plurality of movable permanent magnets 24 are positioned in the circumferential direction by holders 25 formed of non-magnetic material such as aluminium and are disposed so that the S- or N-poles thereof are successively opposed to the inner peripheries of the rods 23, respectively. The magnets 24 are fixedly mounted to the shaft 5 and the holders 25 by strong adhesives. The holders 25 are fitted onto the shaft 5 as shown in FIG. 1 and fixed thereto by pins 26.

In the apparatus constructed above, since the outer tube 7 is prevented from rotating with regard to the head stock 4, when the main shaft 3 is rotated in the direction of arrow a, for example, the steel ball 13 moves from the notch 16 onto the outer periphery of the shaft 5 in the radial direction.

When the main shaft 3 is rotated by 90° in the direction of arrow a, the rotation of the shaft 5 is stopped by the bolt 11. At this time, the rotation of the main shaft 3 is stopped and the steel ball 13 is fitted in the other notch 16 so that the shaft 5 is positioned with respect to the outer tube 7 in the rotational direction and locked therein.

Figure 2A:
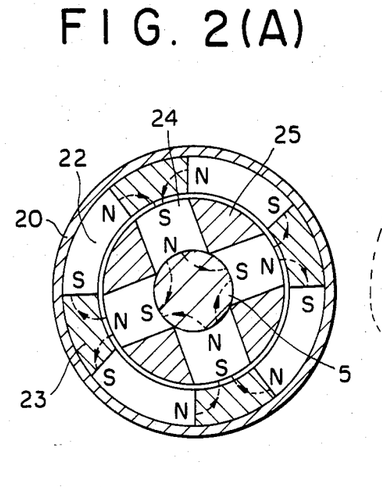
Figure 2B:
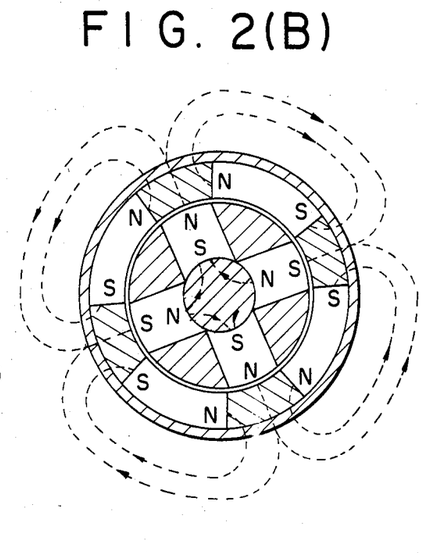

When the main shaft 3 is rotated in the direction of arrow a and stopped, the relative position of the shaft 5 and the outer tube 7 is shown in FIG. 2(A). At this position, the attracting rods 23 opposed to the N-poles of the stationary permanent magnets 22 are opposed to the S-poles of the movable permanent magnets 24, while the rods 23 opposed to the S-poles of the magnets 22 are opposed to the N-poles of the magnets 24. Thus, internally looped magnetic lines of force as shown by broken lines in FIG. 2(A) are formed. Accordingly, the attracting force for chips formed of magnetic material is not produced in the state shown in FIG. 2(A). When the main shaft 3 is rotated 90° in the direction of arrow b and is stopped, the shaft 5 is rotated in the same direction and is positioned by the notch mechanism including the steel ball 13 to be locked therein. Thus, the relative position of the shaft 5 and the outer tube 7 is shown in FIG. 2(B). In this state, since the same poles of the stationary and movable permanent magnets 22 and 24 are opposed to the rods 23, externally looped magnetic lines of force as shown by broken lines in FIG. 2(B) are formed and the attracting force for chips formed of magnetic material is produced in this state.

Accordingly, after the main shaft 3 is rotated 90° in the direction of arrow b and stopped and the attractive force is on, the attracting unit 28 of the chip disposer moves to approach chips deposited on a work, jig or pallet not shown by operating an NC machine so that the chips on the work, jig or pallet can be removed. The unit 28 is then moved above a unit for carrying chips outside of the apparatus such as a chip conveyer installed within NC machine tool. When the main shaft 3 is rotated 90° in the direction of arrow a and stopped, the attracting force is off and the attracted chips can be dropped on the chip carrying unit to carry them outside.

Second Embodiment

The above chip disposer according to the first embodiment however has a problem concerning the structural strength and durability in the apparatus itself and a possibility that a bearing, not shown, which supports the main shaft 3, can be damaged. For example, when the main shaft 3 is angularly moved in the direction of arrow a, for example, as shown in FIG. 1, the angular movement is stopped by the outer tube 7 through the extension shaft 5 and the bolt 11. At this time, the rotational torque of the main shaft 3 balances with the torque exerted between the arm 18 fixedly mounted to the outer tube 7 and the whirl-stopper 17. The angular movement of the main shaft 3 is thus stopped by the mechanical stopper. Since the driving torque of the main motor in an NC machine tool of a machinging centre however is normally very large particularly in a low speed rotation range, problems arise with respect to the structural strength or durability of the appratus such as damage of the bearing for the main shaft, damage to the end of the bolt 11 and the groove 12, bending of the arm 18, damage of the whirl-stopper 17 and an end of the arm 18 or the like by application of excessive torque to the main shaft 3.

A representative embodiment according to the second aspect of the present invention is now decribed.

Figure 3:
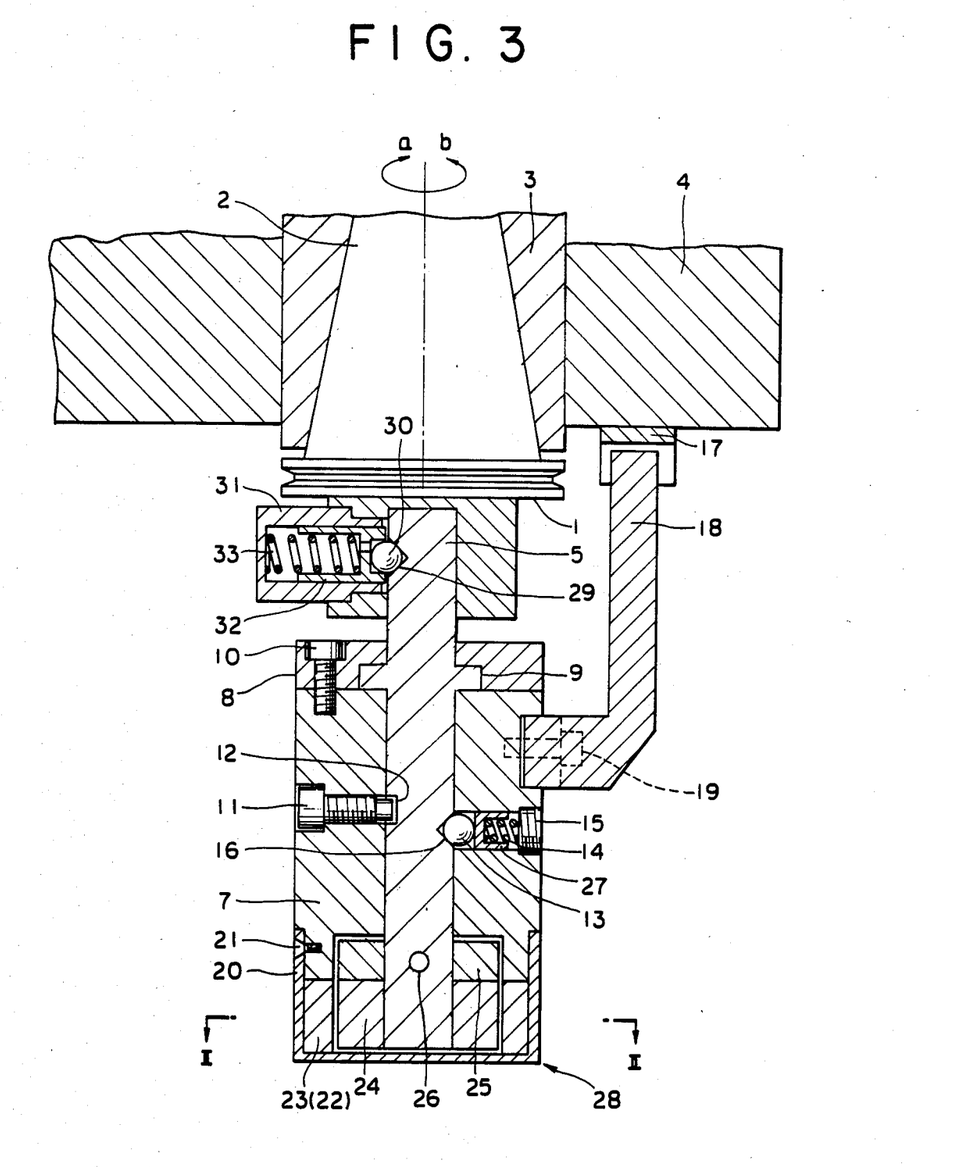
FIG. 3 is a longitudinal sectional view schematically illustrating a second embodiment of the present invention.

FIG. 3 is a sectional view schematically illustrating the chip disposer of the second embodiment. The chip disposer of FIG. 3 has the same structure as that of the first embodiment shown in FIGS. 1 and 2 except for a coupling between the shaft 5 and the side lock holder 1.

More particularly, as shown in FIG. 3, the chip disposer of the present invention includes the shaft 5 which is loosely fitted in a hole formed in the side lock holder 1 and a notch 29 is formed in the shaft 5 in which a steel ball 30 is fitted. A cylinder 31 is fitted in a hole formed in the side lock holder 1 in the radial direction thereof and is fixed by a plurality of bolts. A piston 32 is guided in an inner hole of the cylinder 31 so that the piston 32 is slidably moved in the inner hole in the radial direction of the side lock holder 1. The steel ball 30 is applied with force by means of a spring 33 acting on the piston 32 and is pressed into the notch 29 to attain the function of a so-called torque-limiter.

FIG. 3 shows a state just after the side lock holder 1 is fitted to the main shaft 3 by the automatic tool exchanging apparatus (not shown) and the relative positional relation between the shaft 5 and the outer tube 7 is shown in FIG. 2(A). The spring 33 is set to have a larger resilient force than that of the spring 14. When the main shaft 3 is rotated from this state in the direction of arrow b, the rotation is transmitted through the side lock holder 1, the cylinder 31, the piston 32 and the steel ball 30 to the shaft 5. When the shaft 5 is rotated by 90° in the direction of arrow b, the rotation is stopped by the bolt 11. At this time, however, the main shaft 3 still rotates in the same direction of arrow b and the steel ball 30 moves out from the notch 29 against the pressing force of the spring 33, so that the main shaft 3 and the side lock holder 1 slip with regard to the shaft 5. After the shaft 5 is rotated 90° in the direction of arrow b, the relative positional relation of the shaft 5 relative outer tube 7 is in a state as shown in FIG. 2(B) and the attracting force for chips formed of magnetic material is produced at the end of the outer tube 7. Even when the rotation of the main shaft 3 is stopped, the relative positional relation of the shaft 5 to the outer tube 7 in the rotational direction is maintained by the notch mechanism composed of the groove 16, the steel ball 13, the piston 27 and the spring 14.

Next, description is made to the case where the main shaft 3 is rotated in the direction of arrow a. In this case, when the steel ball 30 is not fitted in the notch 29, the side lock holder 1 slips with regard to the shaft 5 at the beginning of the rotation, but the steel ball 30 is soon fitted into the notch 29. In this case, if the spring 33 is set to have a sufficiently greater resilient force than that of the spring 14, the steel ball 13 moves out from the notch 16 and the shaft 5 rotates in the direction of arrow a. When the shaft 5 rotates 90° in the direction of arrow a, the rotation is stopped by the bolt 11 but the steel ball 30 moves out from the notch 29 so that the main shaft 3 slips with regard to the shaft 5. Even when the rotation of the main shaft 3 is stopped, the relative positional relation of the shaft 5 with regard to the outer tube 7 is maintained in the state shown in FIG. 2(A). Thus, the function of the torque limiter is provided.

The NC machine tool such as the machining centre has the function of stopping the rotation of the main shaft 3 in a predetermined position for the purpose of automatic exchange of tools. The rotational direction of the main shaft 3 before the time of stopping the main shaft in the predetermined position normally corresponds to the rotational direction in the preceding operation. Accordingly, when the chip disposer of the present embodiment is removed from the main shaft 3 by the automatic tool exchanging unit not shown, the main shaft 3 has previously rotated in the direction of arrow a. Thus, the main shaft is stopped in the predetermined position after rotating in the direction of arrow a. Consequently, the chip disposer is safely removed when the relative positional relation of the shaft 5 with regard to the outer tube 7 is in the state of FIG. 2(A), that is, when the attracting force for chips is cut off.

Third Embodiment

Figure 11:
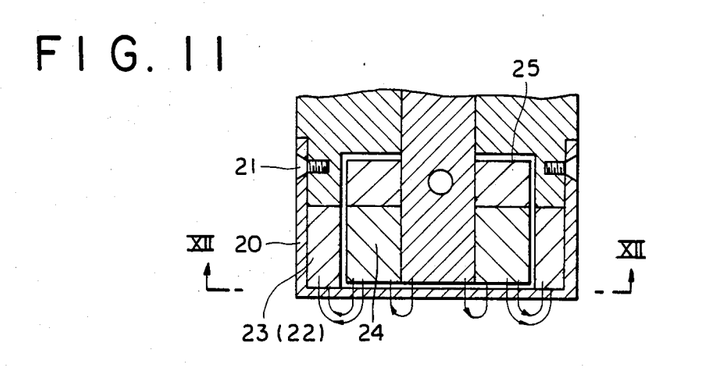
FIG. 11 is a partial sectional view illustrating a leakage flux distribution when attractive force of the apparatus of FIG. 1 is off.
Figure 12:
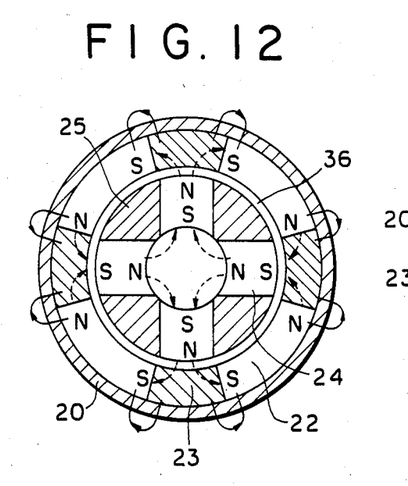
FIG. 12 is a sectional view illustrating a leakage flux distribution of a portion taken along line XII—XII of FIG. 11.

FIG. 11 shows a longitudinal section of the end of the outer tube 7 of the first embodiment shown in FIG. 1 and FIG. 12 shows a section taken along ling XII—XII of FIG. 11.

The chip disposer of the above first embodiment has a problem in that parts of attracted chips are not removed from the attracting device since magnetic lines of force leak a little when the attracting force is off as shown in FIG. 12. This is because a gap 36 between the externally disposed stationary permanent magnets 22 and attracting rods 23 and the internally disposed movable permanent magnets 24, junctions between the stationary permanent magnets 22 and the rods 23 and junctions between the movable permanent magnets 24 and the extension shaft 5 form magnetic resistances. Thus, magnetic flux or magnetic lines of force leak from these portions a little as shown by solid lines with arrow shown in FIGS. 11 and 12.

The third invention concerns the improvement of the above chip disposer and an object of the invention is to provide the improved chip disposer in which magnetic flux or magnetic lines of force do not leak outside of the outer shell thereof and chips can be effectively removed.

Figure 4:
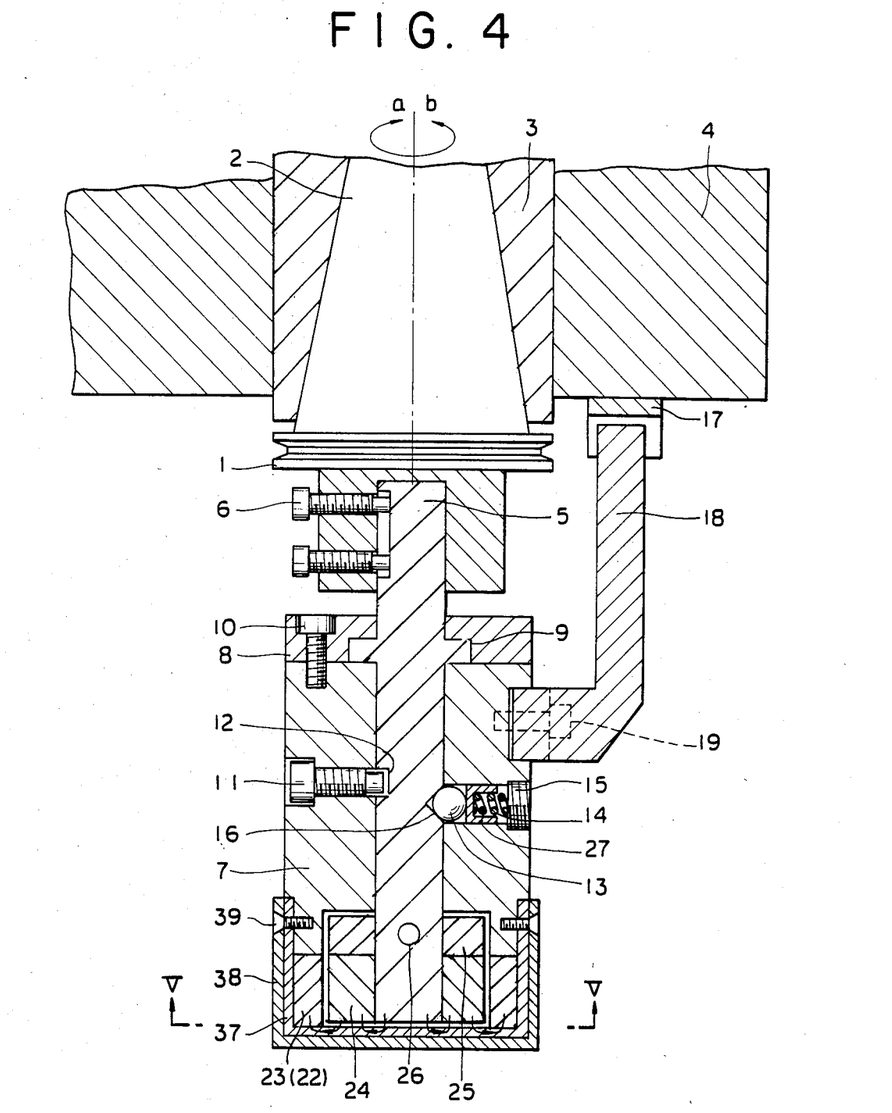
FIG. 4 is a longitudinal sectional view schematically illustrating a third embodiment of the present invention.

The third embodiment is now described with reference to FIG. 4 showing a sectional view from the front side thereof and FIGS. 5(A) and (B) showing a sectional view taken along line V—V of FIG. 4.

The chip disposer of the embodiment comprises, in addition to the first embodiment shown in FIGS. 11 and 12, an outer shell 37 formed of magnetic material and a cap 38 formed of non-magnetic material such as stainless steel and which is fitted around the outer shell 37 to cover the outer shell 37 and is fixedly mounted to the end of the outer tube 7 by a plurality of screws 39. Other structure of the third embodiment is quite identical with that of the first embodiment.

Figure 5A:
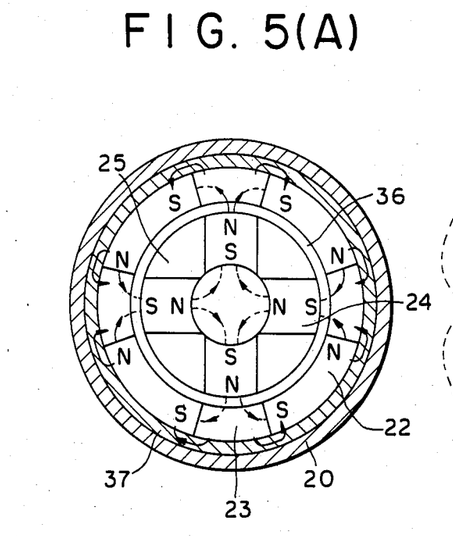
Figure 5B:
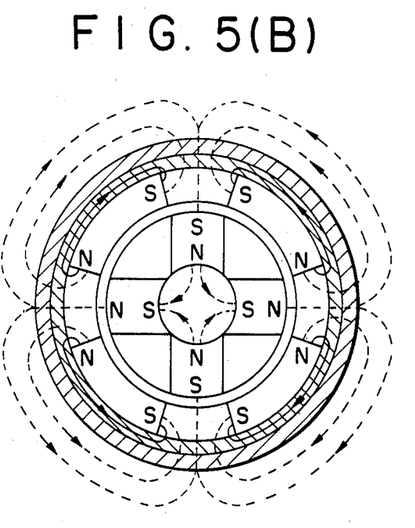

Accordingly, in the state of FIG. 5(A), most of the magnetic lines of force are formed internally as shown by broken line in FIG. 5(A). The leakage magnetic flux or magnetic lines of force slightly leaking from the gap 36, the junction between the stationary permanent magnets 22 and the attracting rods 23 and the junction between the movable permanent magnets 24 and the shaft 5 pass through the outer shell 37 formed in magnetic material as shown by solid line with arrow of FIGS. 4 and 5(A). Accordingly, magnetic flux or magnetic lines of force do not leak outside of the outer shell 37 at all and attracting force for chips formed of magnetic material is not produced. When changing to the state as shown in FIG. 5(B), magnetic lines of force are formed externally as shown by broken lines. At this time, while parts of the magnetic lines of force pass through the outer shell 37 formed of magnetic material as shown by solid lines with arrow of FIG. 5(B), most of magnetic lines of force pass outside of the outer shell 37 and the cap 38 because of magnetic saturation of outer shell 37 and hence the attracting force for chips formed of magnetic material is produced.

Fourth Embodiment

In the above chip disposer according to the first and second embodiments, if the diameter of the attracting device 28 is made smaller, the construction of the whole apparatus is not only difficult but also the magnetic flux density at the top flat end of the attracting surface of the attracting device 28 is relatively small as compared with the flux density at the outer periphery of the attracting surface thereof. Accordingly, when it is particularly used in a vertical machining centre, it lacks sufficient attracting force at the top end of the attracting device and can not exhibit a sufficient chip removing function.

More particularly, as shown in FIGS. 2(A) and (B), since the stationary permanent magnets 22 and the movable permanent magnets 24 both have the same thickness in the axial direction of the extension shaft 5, the operation of turning on and off of the attracting force and the attracting capability are determined by the dimensional relation of the magnets 22 and 24 and the attracting rods 23 in a section normal to the shaft. Accordingly, in order to remove chips in a narrow groove, if the diameter of the attracting device is small, the space for disposing the magnets 22 and 24 and the attracting rods 23 is made smaller and the construction of the apparatus is difficult.

Figure 13:
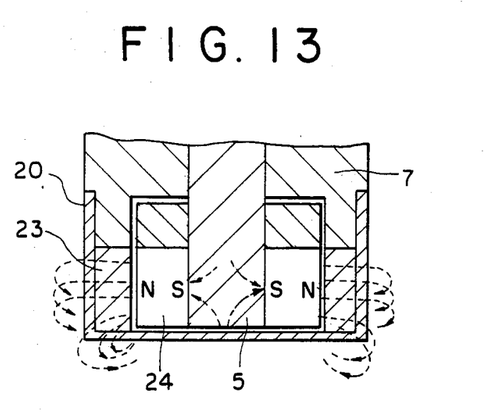
FIG. 13 is a partial longitudinal sectional view illustrating a magnetic flux distribution in the attracting unit of the apparatus of FIG. 3.

Parts of the magnet lines of force produced from the stationary permanent magnets 22 shown in FIG. 2(B) occur in the perpendicular direction. Further, the magnetic flux density in the outer peripheral direction in a plane of the view of FIG. 2(B) is larger than the flux density in the perpendicular direction to the view of FIG. 2(B) by the operation of the magnetic lines of force produced from the movable permanent magnets 24. The magnetic lines of force generated from one pole of each of the movable permanent magnets 24 which is in contact with the shaft 5 pass through the shaft 5 into the pole of each of the adjacent magnets 24. The magnetic lines of force generated from the other poles of the movable permanent magnets 24 which are in contact with the attracting rods 23 pass through the attracting rods as shown by broken line of FIG. 13 and parts thereof enter into the adjacent attracting rods from the axial direction of the shaft 5 while the remaining enter into the adjacent rods 23 from the outer pheripheral direction of the cap 20. However, since the N- and S-poles of the movable permanent magnets 24 are directed in the radial direction, the magnetic flux density in the axial direction is smaller than that in the outer peripheral direction. Consequently, the attracting force at the top flat end of the attracting device 28 shown in FIG. 1 or 3 is weak.

The fourth invention concerns the improvement of the above chip disposer, and more particularly is to provide an improved chip disposer in which the magnetic flux density at the top flat end of the chip attracting device which is disposed at the top end of the outer tube is increased to enhance the chip removing capability.

Figure 6:
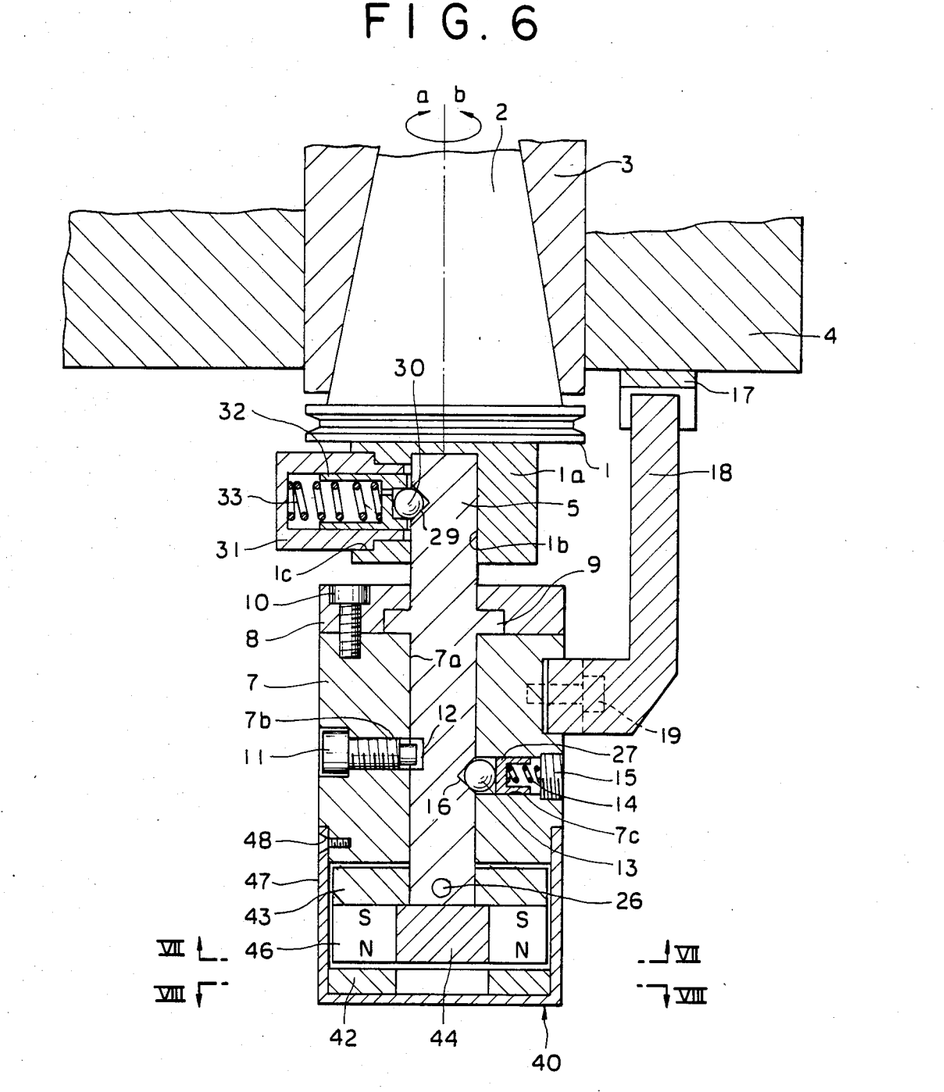
FIG. 6 is a longitudinal sectional view schematically illustrating a fourth embodiment of the present invention.
Figure 7:
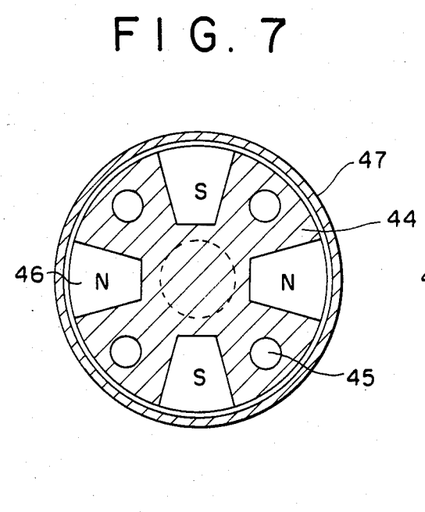
FIG. 7 is a sectional view taken along line VII—VII of FIG. 6.
Figure 8:
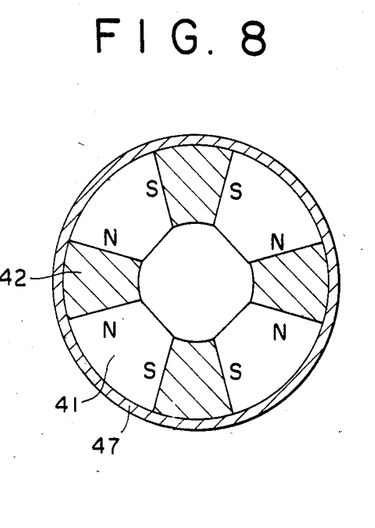
FIG. 8 is a sectional view taken along line VIII—VIII of FIG. 6.

An embodiment of the fourth invention is now described. FIGS. 6 to 9 show the chip disposer according to the embodiment, which FIG. 6 is a longitudinal sectional view schematically illustrating the apparatus, and FIGS. 7 and 8 are sectional views taken along line VII—VII and line VIII—VIII of FIG. 6, respectively.

In the chip disposer of the present embodiment, like the chip disposer according to the first and second embodiment, the taper shank 2 of the side lock holder 1 is detachably fitted to the machine shaft 3 of the machine tool. The chip disposer of the present embodiment comprises a shaft 5 extending in the axial direction of the side lock holder 1 and detachably and lockably attached to the side lock holder 1, an outer tube 7 which is rotatably fitted onto the shaft 5, a rotation prevention mechanism of the outer tube 7 mounted to the head stock 4, a positioning mechanism of the shaft 5 with regard to the outer tube 7 and an attracting device 40 for turning on and off attracting force for chips by the permanent magnets disposed at an end of the outer tube in response to rotation of the main shaft 3. The structure of the chip disposer, except the attracting device 28, is the same as that of the chip disposer of the first and second embodiments shown in FIGS. 1 to 3 and 13, and like numerals of FIGS. 6 to 9 correspond to those shown in FIGS. 1 to 3 and 13.

In FIGS. 6 to 9, numerals 1a, 1b and 1c denote a projection of the side lock holder 1, a hole formed in the projection 1a and a stepped hole formed from a side wall of the projection 1a in the radial direction thereof toward the hole 1b to communicate with the hole 1b respectively. Numerals 9, 29 and 12 denote a flange formed on the shaft, a first notch and a groove. Numeral 16 denotes a second notch formed in the shaft 5 with another second notch (not shown) being formed in another position of the shaft 5 different by 90°. Numeral 7a denotes an inner hole formed in the outer tube 7 in the axial direction thereof, numeral 7b denotes a screwed hole communicating with the groove 12 formed in the shaft 5, numeral 7c denotes a hole communicating with the second notch in the shaft 5, numeral 8 denotes a flange, numerals 10, 11 and 19 denote bolts, numeral 15 denotes a screw, numeral 31 denotes a cylinder, numerals 27 and 32 denote pistons, numeral 14 and 33 denote springs, numeral 13 and 30 denote steel balls, numeral 17 denotes a whirl-stopper, numeral 18 denotes an arm, numeral 26 denotes a pin, numeral 41 denotes stationary permanent magnets, numeral 42 denotes attracting rods, numeral 43 denotes an armature, numeral 44 denotes a holding member, numeral 45 denotes bolts, numeral 46 denotes movable permanent magnets, numeral 47 denotes a cap formed of non-magnetic material, numeral 48 denotes a plurality of screws for fixedly mounting the cap 47 to the outer tube 7, and numeral 40 denotes an attracting device.

The attracting device 40 of the chip disposer of the embodiment includes a fourth permanent magnet group composed of a plurality of (in this embodiment, four) movable permanent magnets 46, 46, . . . and a third permanent magnet group composed of a plurality of stationary permanent magnets 41, 41, . . . , both the groups being juxtaposed successively in the lengthwise direction of the shaft 5 at the end of the outer tube 7. The stationary permanent magnets 41, 41 forming the third group are disposed in a ring in the circumferential direction so that the magnetic polarities of the poles of the magnets 41 are equal to the magnetic polarities of the opposed poles of the adjacent magnets 41. The magnets 46,46 of the fourth group are magnetized in the axial direction of the shaft 5 and are arranged so that the N- and S-poles of the adjacent magnets 46 are succesively and altneratively opposed to the third permanent magnet group. Further, the third group is disposed at the end side of the outer tube 7 while the fourth group is disposed near the shaft 5 and is angularly moved in response to the angular movement of the shaft 5 with regard to the outer tube 7.

In FIGS. 6 to 8, the four stationary permanent magnets 41 are disposed in a ring in the circumferential direction of the shaft 5 between the attracting rods 42 formed of magnetic material so that the magnetic polarities of the poles of the magnets 41 are equal to the magnetic polarities of the opposed poles of the adjacent magnets 41, and are fixedly attached to the cap 47 formed of non-magnetic material by strong adhesive. The cap 47 is fitted onto the outer peripheral end surface of the outer tube 7 and fixed by a plurality of screws 48. The armature 43 formed of magnetic material such as steel is attached to the end of the shaft 5 and fixed thereto by a pin 26. The holding member 44 formed of non-magnetic material such as aluminium or stainless steel is fixed to the armature 43 by a plurality of bolts 45 formed of non-magnetic material such as stainless steel. In the present invention, the four movable permanent magnets 46 are fitted in grooves formed in the outer periphery of the holding member 44 and one end of each of the magnets 46 is fixed to the armature 43 by strong adhesive in contact with the armature. The movable permanent magnets 46 are disposed so that the N- and S-poles are alternately opposed to a plurality of (four) attracting rods 42. Thus, the third group composed of the stationary permanent magnets 41 and the attracting rods 42 and the fourth group composed of the movable permanent magnets 46 are juxtaposed in the axial direction of the shafts 5.

Figure 9:
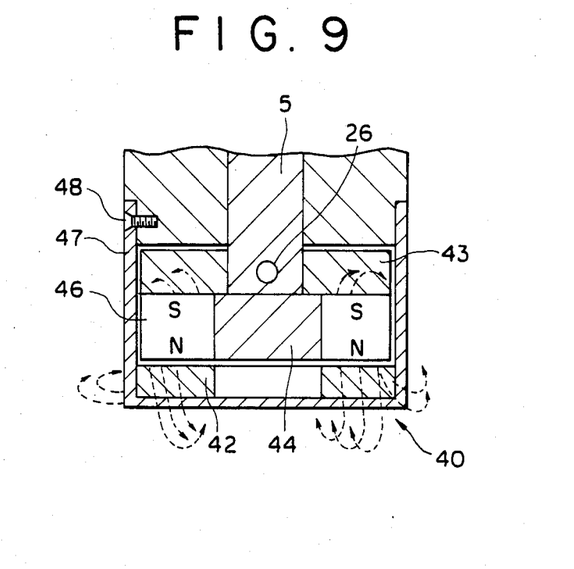
FIG. 9 is a partial sectional view illustrating a structure of an attracting unit in the apparatus of FIG. 6.

In the state shown in FIGS. 6 to 8, since the same poles of the movable permanent magnets 46 and the stationary permanent magnets 41 are opposed to the attracting rods 42, external magnetic lines of force as shown in FIG. 9 are formed and the chip attracting force is produced. In this case, the magnetic lines of force produced from the surface in which the movable permanent magnets 46 are in contact with the armature 43 pass through the armature 43 and enter into the adjacent movable permanent magnets 46. The turning on and off of the attracting force for chips by angularly moving the shaft 5 with regard to the outer tube 7 by a predetermined angle, that is, 90° in the present embodiment is the same as the above embodiments.

When the attracting force is produced, the magnetic lines of force generated from the stationary permanent magnets 41 pass through the attracting rods 42 by the repulsion of the magnetic field formed by the movable permanent magnets 46. Then, most of the magnetic lines of force go out of the cap 47 from the axial direction of the shaft 5 and enter into the adjacent attracting rods 42. On the other hand, the magnetic lines of force produced from the poles of the movable permanent magnets 46 opposed to the attracting rods 42 go into the attracting rods 42 as shown in FIG. 9 and then parts of the magnetic lines of force pass through the outer periphery of the cap 47 into the adjacent attracting rods 42, while other magnetic lines of force go out from the flat end of the cap 47 in the axial direction of the shaft 5 and enter into the adjacent attracting rods 42. Since the N- and S-poles of the movable permanent magnets 46 are disposed in the axial direction of the shaft 5, the magnetic flux density thereof in the axial direction is larger than that in the outer periphery. Accordingly, the chip disposer according to the present invention has larger attracting force in the flat end of the attracting device 40 than that in the outer periphery thereof.

Further, since the movable permanent magnets 46 and the stationary permanent mangets 41 are juxtaposed in the axial direction, the chip disposer according to the present invention is advantageous in design space as compared with the prior art.

In the present embodiment, while the stationary permanent magnets 41 and the attracting rods 42 are disposed at the side of the outer tube 7 and the movable permenent magnets 46 are disposed at the side of the shaft 5, the stationary permanent magnets 41 and the attracting rods 42 may be disposed at the side of the shaft 5 and the movable permanent magnets 46 may be disposed at the side of the outer tube 7.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A chip disposer comprising an extension shaft detachably mounted to a main shaft of machine tool, an outer tube formed of non-magnetic material and rotatably fitted to said extension shaft, a mechanism mounted in a head stock of the machine tool for preventing rotation of said outer tube, a mechanism for positioning said extension shaft with regard to said outer tube, a first permanent magnet group including a plurality of permanent magnets which are disposed in a ring through attracting rods formed of magnetic material in an end of said outer tube so that the same poles of the adjacent permanent magnets of said first group are opposed to each other and a second permanent magnet group including a plurality of permanent magnets which are disposed in a ring around said extension shaft so that the S- and N-poles of the permanent magnets of said second group are alternately opposed to the inner peripheries of the plurality of attracting rods, whereby relative position of said first permanent magnet group disposed in the end of said outer tube and said second permanent magnet group disposed around said extension shaft is changed in response to normal rotation and reverse rotation of said main shaft to turn on and off attracting force for chips.

2. A chip disposer comprising an extension shaft detachably mounted to a main shaft of machine tool, an outer tube formed of non-magnetic material and rotatably fitted to said extension shaft, a mechanism mounted in a head stock of the machine tool for preventing rotation of said outer tube, a mechanism for positioning said extension shaft with regard to said outer tube, a first permanent magnet group including a plurality of permanent magnets which are disposed in a ring through attracting rods formed of magnetic material in an end of said outer tube so that the same poles of the adjacent permanent magnets of said first group are opposed to each other and a second permanent magnet group including a plurality of permanent magnets which are disposed in a ring around said extension shaft so that the S- and N-poles of the permanent magnets of said second group are alternately opposed to the inner peripheries of the plurality of attracting rods, whereby relative position of said first permanent magnet group disposed in the end of said outer tube and said second permanent magnet group disposed around said extension shaft is changed in response to normal rotation and reverse rotation of said main shaft to turn on and off attracting force for chips, said chip disposer characterized in that said extension shaft is detachably and lockably supported in an end of a shank detachably mounted to the main shaft and said chip disposer further comprises torque limit means which further rotatably supports the support portion of said extension shaft.

3. A chip disposer comprising an extension shaft detachably mounted to a main shaft of a machine tool, an outer tube formed of non-magnetic material and rotatably fitted to said extension shaft, a mechanism mounted in a head stock of the machine tool for preventing rotation of said outer tube, a mechanism for positioning said extension shaft with regard to said outer tube, a first permanent magnet group including a plurality of permanent magnets which are disposed in a ring through attracting rods formed of magnetic material in an end of said outer tube so that the same poles of the adjacent permanent magnets of said first group are opposed to each other and a second permanent magnet group including a plurality of permanent magnets which are disposed in a ring around said extension shaft so that the S- and N-poles of the permanent magnets of said second group are alternately opposed to the inner peripheries of the plurality of attracting rods, whereby relative position of said first permanent magnet group disposed in the end of said outer tube and said second permanent magnet group disposed around said extension shaft is change in response to normal rotation and reverse rotation of said main shaft to turn on and off attracting force for chips, said chip disposer characterized by the provision of a first outer shell formed of magnetic material and disposed outside of said first permanent magnet group and a second outer shell formed of non-magnetic material and disposed outside of said first outer shell.

4. A chip disposer including an extension shaft which is detachably and lockably supported to an end of a shank detachably mounted ot a main shaft of a machine tool, an outer tube which is rotatably fitted to said extension shaft and formed of non-magnetic material, a mechanism for preventing rotation of said outer tube and which is provided in a head stock of the machine tool, a mechanism for positioning said extension shaft with regard to said outer tube and an attracting device disposed in an end of said outer tube for turning on and off attracting force of permanent magnets in response to rotation of said main shaft, said chip disposer characterized in that said attracting device comprises a third permanent magnet group and a fourth permanent magnet group each including a plurality of permanent magnets and which are successively disposed in the lengthwise direction of said extension shaft around said extension shaft in the end of said outer tube, said permanent magnets forming said third permanent manget group being disposed in a ring through attracting rods formed of magnetic material so that the same poles of adjacent permanent magnets of said third group are opposed to each other, said permanent magnets forming said fourth permanent magnet group being disposed while interposing holding members formed of non-magnetic material so that the S- and N-poles of said magnets of said fourth group are successively and alternately disposed to the N- and S-poles of said magnets of said third group, one of both groups being disposed at the side of said extension shaft while the other being disposed in the end of said outer tube concentrically to said extension shaft.

5. A chip disposer for use with a machine tool having a main shaft and a head stock, said chip disposer comprising:

an extension shaft detachably mountable to the main shaft of the machine tool;

an outer tube formed of non-magnetic material, said extension shaft is rotatably mounted within said outer tube;

a rotation preventing means mounted to a head stock of the machine tool and said outer tube for preventing rotation of said outer tube with respect to the head stock;

a positioning means for positioning said extension shaft relative to said outer tube;

a first permanent magnet group including a plurality of permanent magnets and a plurality of attracting rods formed of magnetic material arranged in a first ring disposed within an end of said outer tube, said first ring is arranged in an alternating arrangement of said attracting rods and said permanent magnets, said plurality of permanent magnets are oriented in a circumferential direction of said first ring so that same poles of adjacent permanent magnets are opposed to each other; and a second permanent magnet group including a plurality of permanent magnets arranged in a second ring disposed on said extension shaft and concentric and within said first ring of said first permanent magnet group, said plurality of permanent magnets of said second permanent magnet group are oriented in an axial direction of said second ring and arranged with N-poles and S-poles of said second permanent magnet group alternately opposing said attracting rods of said first ring;

whereby positioning of said first permanent ring magnet group relative to said second permanent magnet group is changed by rotating said extension shaft within said outer tube to turn on and off an attraction force for chips.

6. The chip disposer according to claim 5, including a shank detachably mountable to the main shaft of the machine tool, said extension shaft being fixedly mounted to said shank.

7. The chip disposer according to claim 5, including a shank detachably mountable to the main shaft of the machine tool, said extension shaft being rotatably mounted to said shank, said chip disposer further including a torque limiting means for releasably locking said extension shaft relative to said shank at either of two positions at which either the chip disposer is operational or not operational.

8. The chip disposer of claim 5, including a first outer shell formed of magnetic material and a second outer shell formed of non-magnetic material both connected to said end of said outer tube and covering said first permanent magnet group.

9. A chip disposer for use with a machine tool having a main shaft and a head stock, said chip disposer comprising:

an extension shaft detachably mountable to the main shaft of the machine tool;

an outer tube formed of non-magnetic material, said extension shaft is rotatably mounted within said outer tube;

a rotation preventing means mounted to a head stock of the machine tool and said outer tube for preventing rotation of said outer tube with respect to the head stock;

a positioning means for positioning said extension shaft relative to said outer tube;

a first permanent magnet group including a plurality of permanent magnets and a plurality of attracting rods formed of magnetic material arranged in a first ring, said first ring is arranged in an alternating arrangement of said plurality of attracting rods and said plurality of permanent magnets, said plurality of permanent magnets are oriented in a circumferential direction of said first ring so that same poles of adjacent permanent magnets are opposed to each other; and a second permanent magnet group including a plurality of permanent magnets and a plurality of holding members formed of non-magnetic material interposing said plurality of permanent magnets of said second permanent magnet group, said second permanent magnet group being arranged in a second ring with said plurality of permanent magnets oriented in the direction of a longitudinal axis of said extension shaft with alternating N-poles and S-poles of adjacent permanent magnets on a face of said second ring facing said first ring; one of both said first permanent magnet group and said second magnet group being connected to said extension shaft and one of both said first permanent magnet group and said second permanent magnet group being disposed at an end side of said extension shaft and the other permanent magnet group being disposed in an end of said outer tube, whereby positioning of said first permanent magnet group relative to said second permanent magnet group is changed by rotating sad extension shaft within said outer tube to turn on and off an attraction force for chips.

* * * * *